United States Patent
Soleño et al.

(10) Patent No.: US 9,748,830 B1
(45) Date of Patent: Aug. 29, 2017

(54) CONTROL CIRCUITS USING DIFFERENT MASTER-SLAVE CURRENT SHARING MODES

(71) Applicant: Astec International Limited, Kwun Tong (HK)

(72) Inventors: Antonio Remetio Soleño, Mandaluyong (PH); Sir Lawrence Arzadon Da Jose, Paranaque (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days.

(21) Appl. No.: 15/282,395

(22) Filed: Sep. 30, 2016

(51) Int. Cl.
*H02M 3/158* (2006.01)
*H02M 1/08* (2006.01)
*H02M 1/00* (2006.01)

(52) U.S. Cl.
CPC ...... *H02M 1/08* (2013.01); *H02M 2001/0009* (2013.01)

(58) Field of Classification Search
CPC ......... H02M 2001/0003; H02M 3/156; H02M 3/158; H02M 3/1584; H02M 3/1588
See application file for complete search history.

(56) References Cited

U.S. PATENT DOCUMENTS

| 6,191,569 | B1 | 2/2001 | Arbetter et al. | |
|---|---|---|---|---|
| 6,642,631 | B1 * | 11/2003 | Clavette | H02J 1/102 307/52 |
| 6,850,045 | B2 * | 2/2005 | Muratov | H02M 3/1584 323/240 |
| 7,151,362 | B1 * | 12/2006 | Siri | H02M 3/157 323/271 |
| 7,772,821 | B2 * | 8/2010 | Liu | H02J 1/102 323/283 |
| 8,810,217 | B2 * | 8/2014 | Malmberg | H02J 1/102 323/272 |
| 9,496,791 | B2 * | 11/2016 | Ejury | H02M 3/1584 |
| 2007/0248877 | A1 | 10/2007 | Qahoug et al. | |

* cited by examiner

*Primary Examiner* — Gary L Laxton
(74) *Attorney, Agent, or Firm* — Harness, Dickey & Pierce, P.L.C.

(57) ABSTRACT

A control circuit is provided for controlling two power converters in a master-slave current sharing relationship. The control circuit is adapted to detect a presence of a dynamic load condition, control the two power converters in a default master-slave current sharing mode based on a current sharing correction function, and in response to detecting the presence of the dynamic load condition, disable the current sharing correction function so that the two power converters are controlled in a modified master-slave current sharing mode to substantially prevent oscillation between output currents of the two power converters. The control circuit may be one or more components of the power supply including the two power converters. Other example power supplies, control circuits and control methods are also disclosed.

20 Claims, 11 Drawing Sheets

CONTROL CIRCUITS USING DIFFERENT MASTER-SLAVE CURRENT SHARING MODES

FIELD

The present disclosure relates to control circuits using different master-slave current sharing modes.

BACKGROUND

This section provides background information related to the present disclosure which is not necessarily prior art.

Power supplies commonly include two or more power converters controlled in a master-slave current sharing relationship. Sometimes, the master power converter provides a reference signal to the slave power converter(s). This reference signal is used to adjust an output current of the slave power converter(s) to closely match the output current of the master power converter. The power converters sometimes have matching voltage-loop responses and/or increased current-share loop bandwidths to maintain master/slave roles during dynamic load conditions.

SUMMARY

This section provides a general summary of the disclosure, and is not a comprehensive disclosure of its full scope or all of its features.

According to one aspect of the present disclosure, a power supply for supplying a regulated output voltage includes two power converters each having an output coupled in parallel with each other, and a control circuit coupled to the two power converters. The two power converters are controllable in a master-slave current sharing relationship. The control circuit is adapted to detect a presence of a dynamic load condition of a load coupled to the power supply, control the two power converters in a default master-slave current sharing mode based on a current sharing correction function, and in response to detecting the presence of the dynamic load condition, disable the current sharing correction function so that the two power converters are controlled in a modified master-slave current sharing mode to substantially prevent oscillation between output currents of the two power converters.

According to another aspect of the present disclosure, a control circuit is provided for controlling two power converters of a power supply in a master-slave current sharing relationship. The control circuit is adapted to detect a presence of a dynamic load condition of a load coupled to the power supply, control the two power converters in a default master-slave current sharing mode based on a current sharing correction function, and in response to detecting the presence of the dynamic load condition, disable the current sharing correction function so that the two power converters are controlled in a modified master-slave current sharing mode to substantially prevent oscillation between output currents of the two power converters.

According to yet another aspect of the present disclosure, a method is provided for controlling two power converters of a power supply in a master-slave current sharing relationship. The method includes detecting a presence of a dynamic load condition of a load coupled to the power supply, controlling the two power converters in a default master-slave current sharing mode based on a current sharing correction function, and in response to detecting the presence of the dynamic load condition, disabling the current sharing correction function so that the two power converters are controlled in a modified master-slave current sharing mode to substantially prevent oscillation between output currents of the two power converters.

According to another aspect of the present disclosure, a power supply for supplying a regulated output voltage includes two power converters each including an output coupled in parallel with each other and a control circuit coupled to the two power converters. The two power converters are controllable in a master-slave current sharing relationship. The control circuit includes a proportional-integral (PI) controller. The control circuit is adapted to detect a presence of a dynamic load condition of a load coupled to the power supply. The PI controller is adapted to control the two power converters in a default master-slave current sharing mode based on a current sharing correction function, and in response to the control circuit detecting the presence of the dynamic load condition, disable the current sharing correction function so that the two power converters are controlled in a modified master-slave current sharing mode to substantially prevent oscillation between output currents of the two power converters.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts and/or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Power supplies including power converters controlled in a master-slave current sharing relationship sometimes experience undesirable output fluctuations during dynamic loading conditions. For example, when a load transitions between a low load and a high load (e.g., a dynamic loading condition), the master-slave relationship between the power converters may reverse (e.g., flip) such that the power converter previously functioning as the master power converter becomes the slave power converter, and the power converter previously functioning as the slave power converter becomes the master power converter. As further explained below, this role reversal may repeat for a period of time, continuously, etc. As recognized by the inventors of the subject application, the master-slave role reversal between power converters may cause undesirable conditions at the converters' output.

In some embodiments, the master-slave role reversal may be caused by a difference in the voltage-loop response for each power converter. For example, FIGS. 1 and 2 illustrate output currents and output voltages of two power converters controlled in a master-slave current sharing relationship in which a load coupled to the power converters transitions from a high load to a low load (in FIG. 1) and from a low load to a high load (in FIG. 2).

Figure 1:
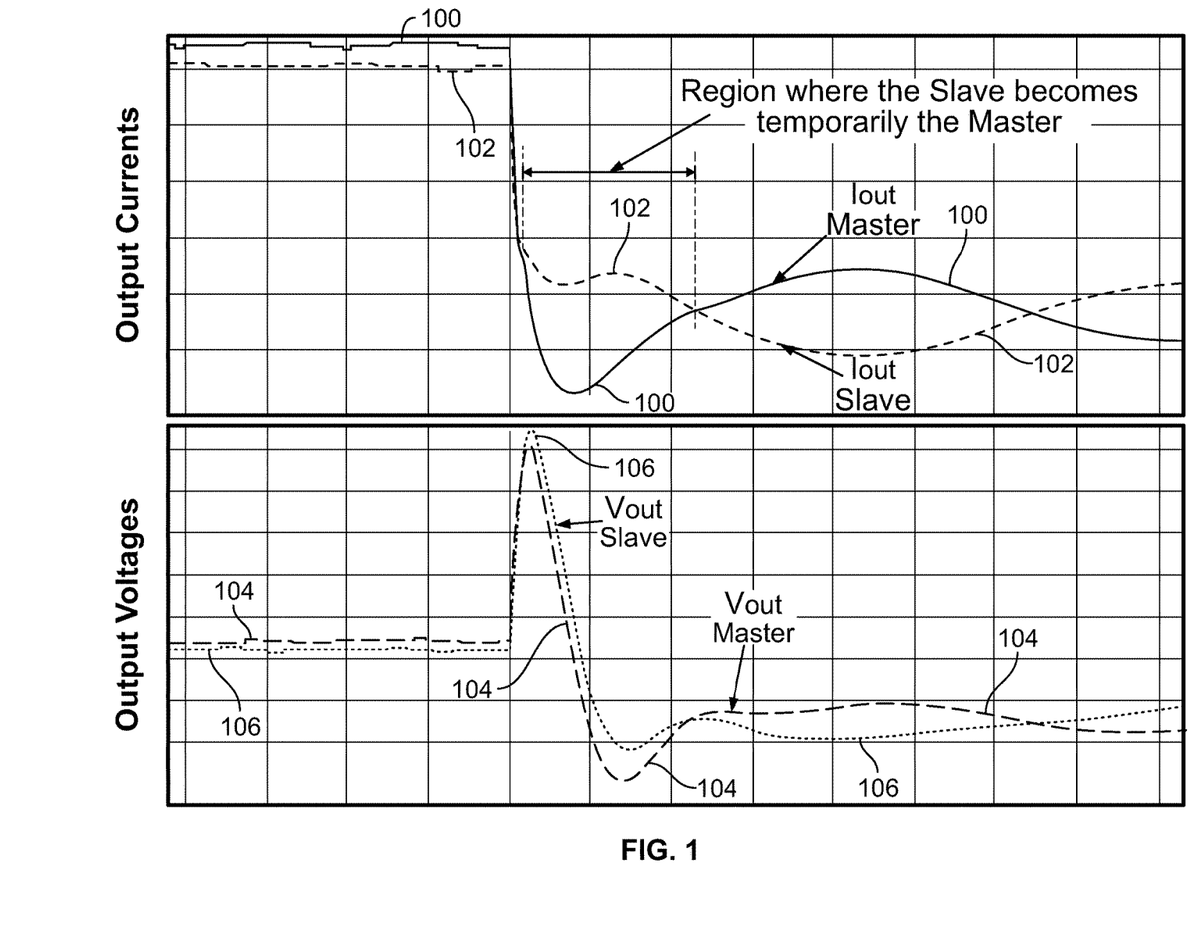
FIG. 1 is a graph of waveforms representing outputs of a master power converter and a slave power converter with the master power converter having a higher voltage-loop gain than the slave power converter according to one example embodiment of the present disclosure.
Figure 2:
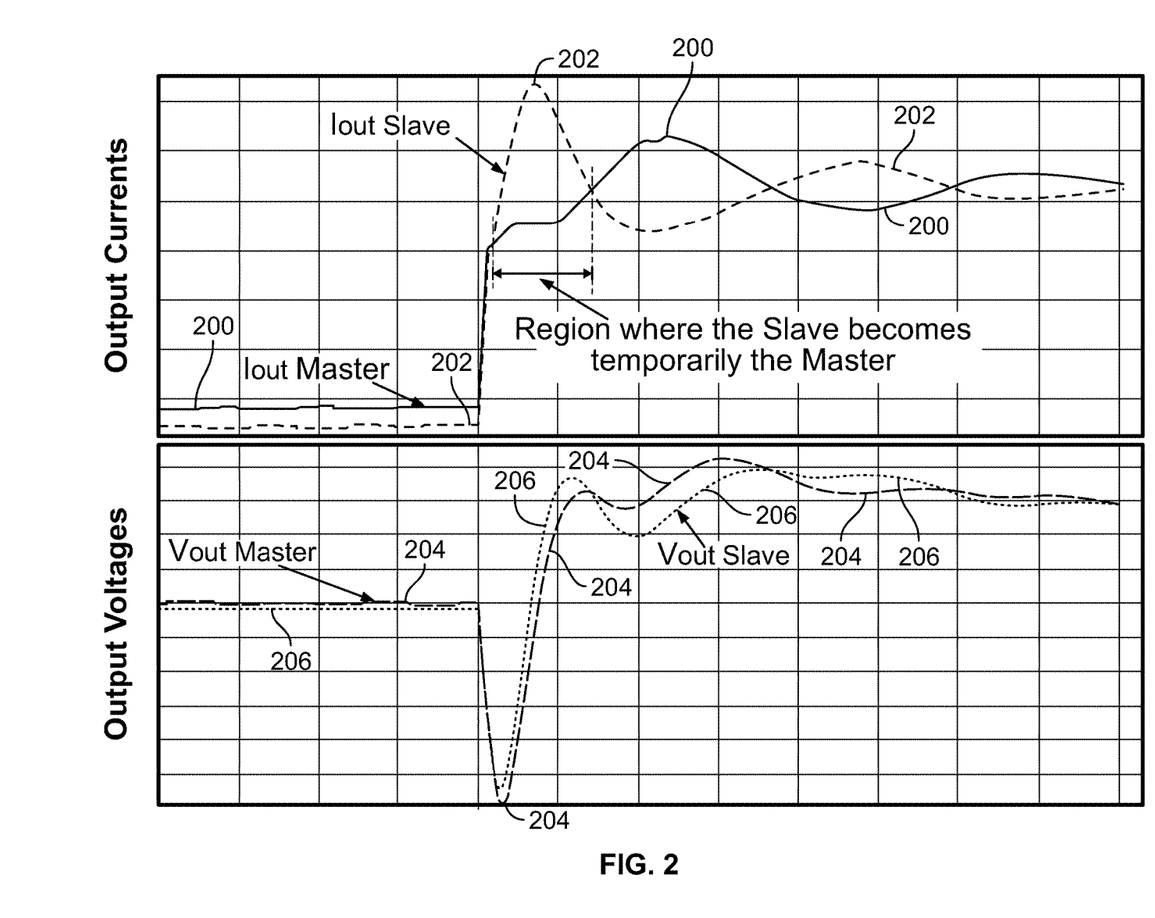
FIG. 2 is a graph of waveforms representing outputs of a master power converter and a slave power converter with the master power converter having a lower voltage-loop gain than the slave power converter according to another example embodiment.

With reference to FIG. 1, the power converter with the initial master functionality has a higher voltage-loop gain than the power converter with the initial slave functionality. As a result, the initial slave power converter has a slower response time to the change in the load than the initial master power converter. This causes an output voltage 106 of the slave power converter to have a higher overshoot than an output voltage 104 of the master power converter. In turn, an output current 100 of the master power converter drops below an output current 102 of the slave power converter.

Because the power converter providing the highest output current generally functions as the master converter, the slave power converter (which is providing more current) and the master power converter reverse roles, as shown in FIG. 1. Put another way, the power converter previously functioning as the master now functions as the slave and the power converter previously functioning as the slave now functions as the master.

As shown in FIG. 1, the role reversal of the power converters may be temporary. For example, the power converters may again reverse roles after the current provided by the power converter functioning as the master falls below the current provided by the power converter functioning as the slave. This role reversal may continue for a period of time until the output currents settle (e.g., a current-share control settling time).

In FIG. 2, the power converter with the initial master functionality has a lower voltage-loop gain than the power converter with the initial slave functionality. As a result, the initial master power converter has a slower response time to the change in the load than the initial slave power converter. This causes an output voltage 204 of the master power converter to have a higher undershoot than an output voltage 206 of the slave power converter. As a result, an output current 202 of the slave power converter increases above an output current 200 of the master power converter, and the slave power converter and the master power converter temporary reverse roles (as explained above) until the output currents settle, as shown in FIG. 2.

Additionally, the master-slave role reversal may be further affected by the length of dynamic load condition (e.g., a dynamic load interval). For example, FIG. 3 illustrates output currents and output voltages of two power converters controlled in a master-slave current sharing relationship in which a dynamic load interval (e.g., about 50 msec) is slower than a current-share control settling time of the converters (e.g., about 40 msec).

Figure 3:
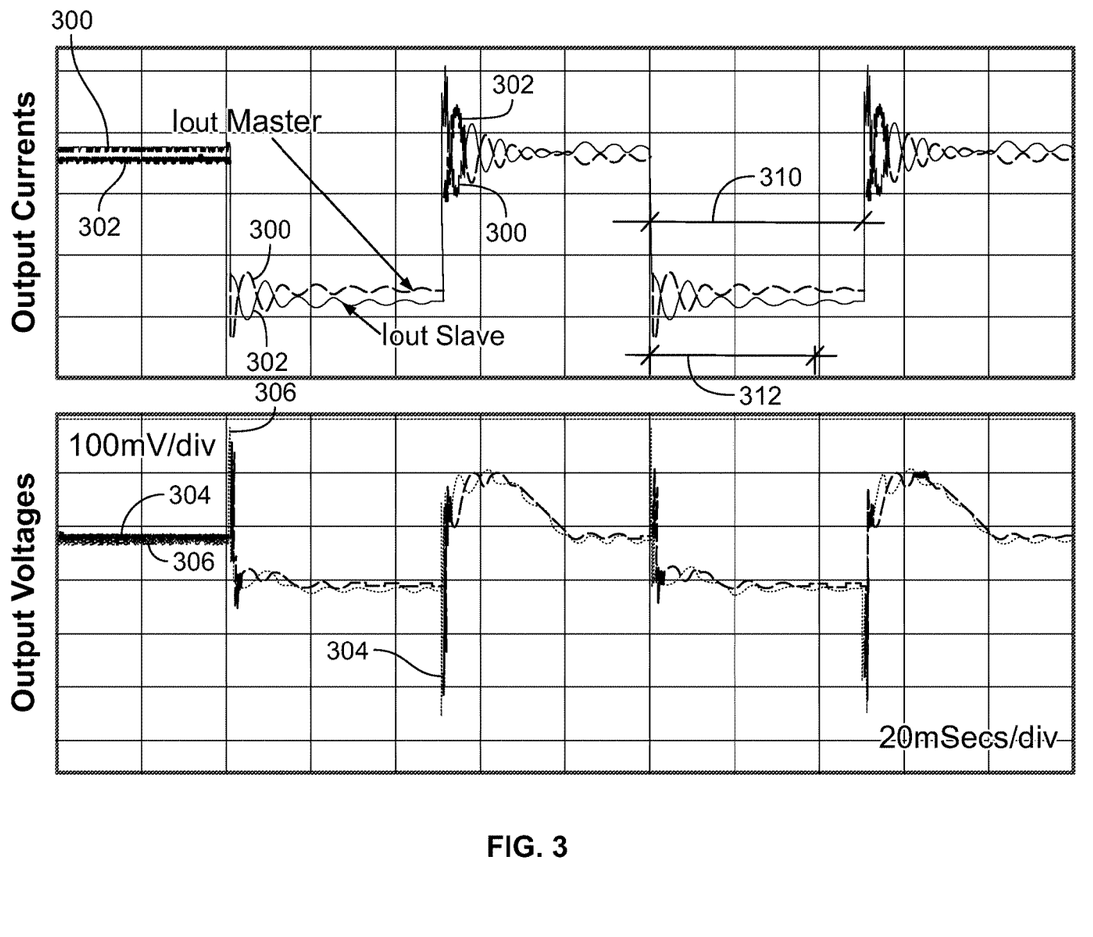
FIG. 3 is a graph of waveforms representing outputs of two power converters experiencing a dynamic load interval slower than a current settling time of the power converters according to yet another example embodiment.

When a load coupled to the power converters transitions between a high load and a low load (as shown in FIG. 3), an output voltage 306 of the slave power converter experiences a higher overshoot than an output voltage 304 of the master power converter and the output voltage 304 of the master power converter experiences a higher undershoot than the output voltage 306 of the slave power converter. This causes an output current 300 of the master power converter to repeatedly drop below an output current 302 of the slave power converter and vice versa, as explained above. Thus, the power converters of FIG. 3 temporary reverse roles several times. However, because the dynamic load interval (indicated by region 310) is slower than the current-share control settling time (indicated by region 312), the role reversal of the power converters quickly ends without causing problems at the converters' output.

Figure 4:
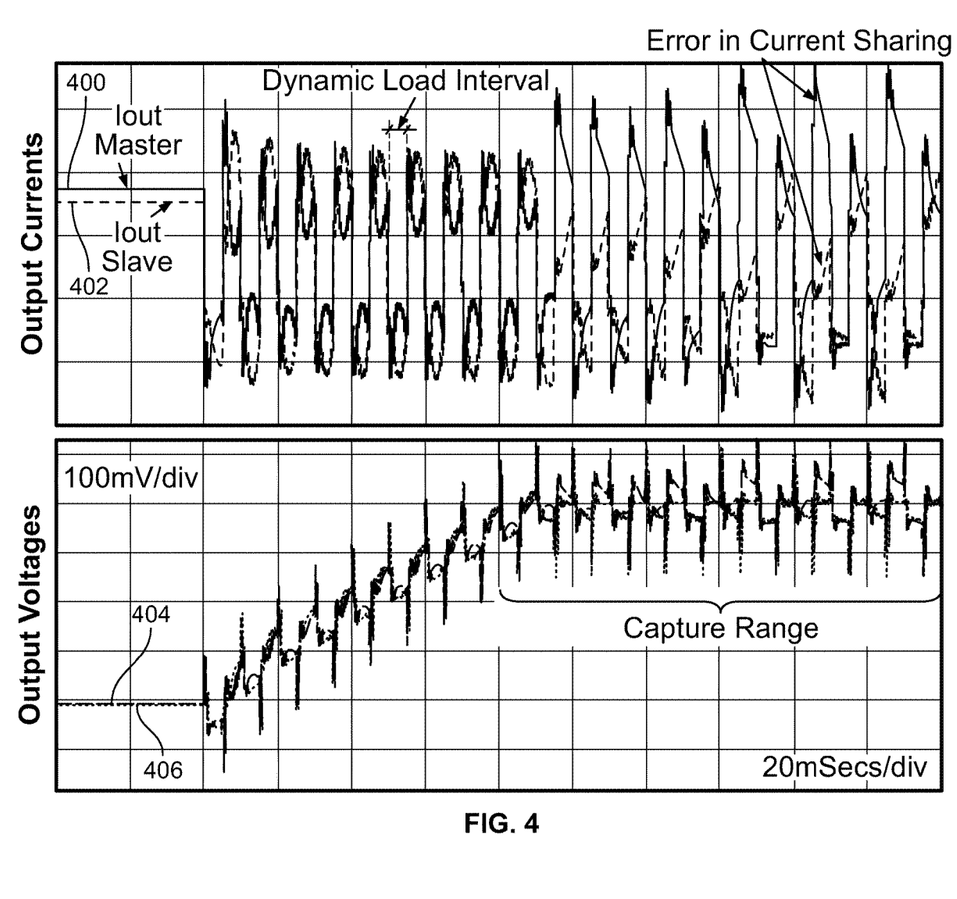
FIG. 4 is a graph of waveforms representing outputs of two power converters experiencing a dynamic load interval faster than a current settling time of the power converters according to another example embodiment.

FIG. 4 illustrates output currents and output voltages of two power converters controlled in a master-slave current sharing relationship in which a dynamic load interval (e.g., about 5 msec) is faster than a current-share control settling time of the converters (e.g., about 40 msec). When a load coupled to the power converters transitions between a high load and a low load (as shown in FIG. 4), the output voltages of the master power converter and the slave power converter react similarly to the voltages shown in FIG. 3, but with at a higher frequency due to the different dynamic load interval. As explained above, this causes the master converter's output current 400 to repeatedly drop below the slave converter's output current 402 (and vice versa), and the power converters to repeatedly reverse roles.

As recognized by the subject inventors, when the voltage-loop response for the power converters are different and a dynamic load interval is faster than a current-share control settling time of the converters (as in the example of FIG. 4), the power converters can experience a substantially continuous master-slave role reversal.

For example, when one of the power converters is functioning as the slave, an output of a current-share control of that power converter increases to increase the converter's output current to match the master converter's output current. However, before the current-share control can correct the converter's output current, a dynamic load transition occurs causing a master-slave role reversal between the power converters, as explained above.

Figure 5:
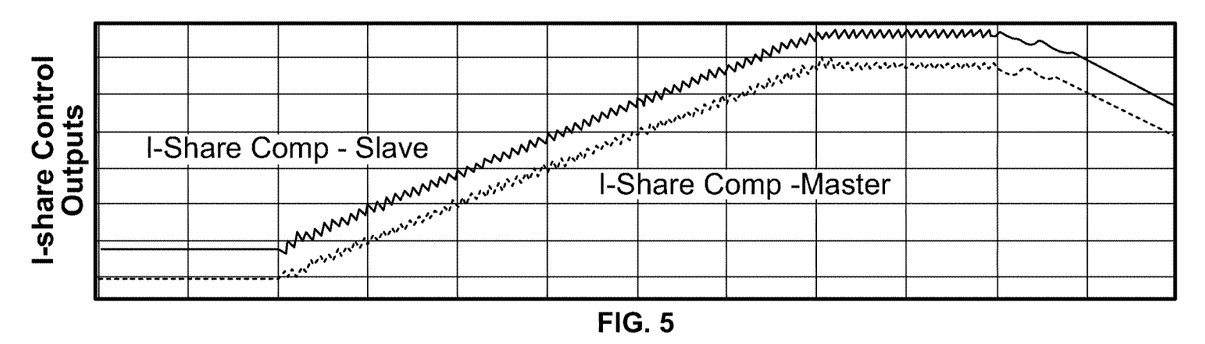
FIG. 5 is a graph of waveforms representing outputs of current-share controls for the power converters of FIG. 4.

When the master-slave roles reverse, the current-share control correction in the previous slave converter (now the master converter) stops and a current-share control in the other power converter (now the slave converter) starts. As such, an output of the current-share control in the now slave power converter (the previous master converter) will increase to correct its output current. This process repeats throughout the continuous master-slave role reversal. As the process repeats, the next correction of each power converter will be added to the previous correction of that converter causing the output of each current-share control to increase over time, as shown in FIG. 5.

This increasing current-share control causes the output voltage 404, 406 of each power converter to increase (e.g., voltage creep-up), as shown in FIG. 4. This increase continues until the voltages saturate to a capture range (e.g., a range of frequencies where the converters can lock operation). Operating in this capture range causes instability of the current-share loop, and desired current sharing may not be achieved. For example, as shown in FIG. 4, once the output voltages settle at the capture range, current sharing between the power converters begins to oscillate. This oscillation may cause one or both converters to provide a high current output which may trigger protection sequences such as an overload protection sequence, etc.

Figure 6:
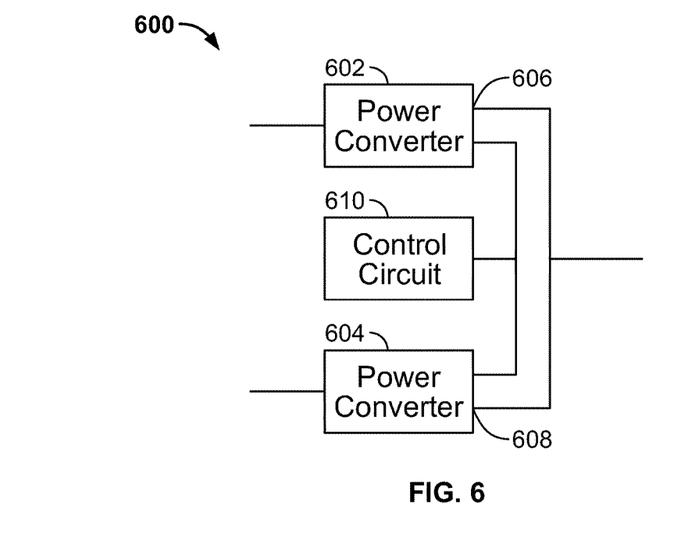
FIG. 6 is a block diagram of a power supply including two power converters controllable in different master-slave current sharing modes according to another example embodiment.

As recognized by the subject inventors, control circuits for power supplies may implement one or more features to prevent an increase in the power converters' output voltages and oscillation between the power converters' output current during dynamic load conditions. For example, a power supply for supplying a regulated output voltage according to one example embodiment of the present disclosure is illustrated in FIG. 6 and indicated generally by reference number 600. As shown in FIG. 6, the power supply 600 includes two power converters 602, 604 controllable in a master-slave current sharing relationship, and a control circuit 610 coupled to the two power converters 602, 604. The power converters 602, 604 each include an output 606, 608 coupled in parallel with each other. The control circuit 610 can detect a presence of a dynamic load condition of a load (not shown) coupled to the power supply 600, control the power converters 602, 604 in a default master-slave current sharing mode based on a current sharing correction function, and in response to detecting the presence of the dynamic load condition, disable the current sharing correction function so that the power converters 602, 604 are controlled in a modified master-slave current sharing mode to substantially prevent oscillation between output currents of the power converters 602, 604.

By disabling the current sharing correction function, outputs of current-share controls in the power converters 602, 604 and output voltages of the power converters are substantially prevented from increasing, as explained above. As a result, oscillation between an output current of the power converter 602 and an output current of the power converter 604 is substantially prevented.

As used herein, the current sharing correction function may be a hardware component and/or software component in the control circuit 610 for controlling the power converters 602, 604. The current sharing correction function can change an output of a current-share control loop in the control circuit 610 which in turn can modify one or both power converters' output. For example, the current sharing correction function can include a correction function (e.g., an output error signal) of an error amplifier, a correction function in a computation algorithm for the current-share control loop, etc. This function can be coded and/or implemented with components in the control circuit, as further explained below.

As explained above, when a current sharing correction function is disabled, an output of the current-share control in the power converters 602, 604 is prevented from increasing. This can be accomplished in various ways. For example, the current sharing correction function can be disabled by changing (e.g., forcing, etc.) an output of a current-share control loop to remain static, setting one or more components, coefficients, etc. in the control circuit 610 to equal a defined value (e.g., zero, etc.), pausing the current-share algorithm, etc. In such examples, the control circuit 610 can be forced to rely on previously used control loop values of when the load was static (e.g., not under a dynamic condition).

Figure 7:
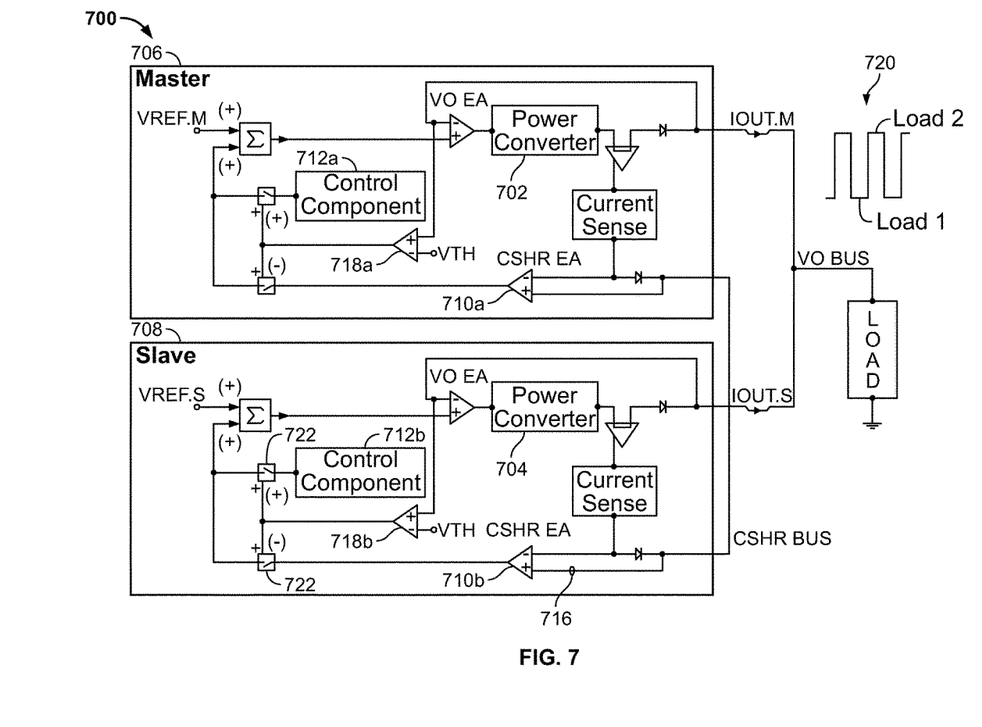
FIG. 7 is a block diagram of a power supply including two power converters experiencing a dynamic load condition and two control circuits for disabling a current sharing correction function according to yet another example embodiment.

For example, FIG. 7 illustrates a power supply 700 including two power converters 702, 704 and two control circuits 706, 708 for controlling the power converters 702, 704. Each control circuit 706, 708 includes a current sharing comparator (CSHR EA) 710a, 710b for comparing its respective converter's output current and a current reference input, and a control component 712a, 712b for storing a previous output of its current sharing comparator 710a, 710b. As shown in FIG. 7, the power converter 702 is designated as the master power converter and the power converter 704 is designated as the slave power converter.

During normal operation, the control circuits 706, 708 control the power converters 702, 704 in a default master-slave current sharing mode based on a current sharing correction function. For example, the slave power converter 704 can be controlled based on an error output of the current sharing comparator 710b. This error output is a function of the output current (e.g., detected via a current sense 714) of the power converter 704 and a current reference input 716 provided from the control circuit 706 via a current sharing bus (CSHR bus). In this way, the output current of the slave power converter 704 can be adjusted to closely match the output current of the master power converter 702.

In the example of FIG. 7, each control circuit 706, 708 can detect a dynamic load condition by comparing a voltage threshold (Vth) to its power converter's output voltage. For example, the control circuits 706, 708 include a comparator 718a, 718b that compares the voltage threshold (Vth) and an output voltage, and provides a signal indicating whether a dynamic load condition exists.

If a dynamic load condition is present (as shown by the square wave 720), the control circuit 708 can disable its current sharing correction function so that the power converters 702, 704 are controlled in a modified master-slave current sharing mode as explained above. For example, if a dynamic load condition is detected, the control circuit 708 can use a previous value of the current sharing comparator 710b provided by the control component 712b.

In such examples, the signal provided by the comparator 718b controls switches 722 so that an output of the control component 712b is used to control the power converter 704 (e.g., switches in the power converter 704) instead of an output of the current sharing comparator 710b. This previous value of the current sharing comparator 710b can correspond to a known value of the current sharing comparator 710b from when the load was static (e.g., not under a dynamic condition). As a result, oscillation between the output current of the power converter 702 and the output current of the power converter 704 is substantially prevented, as explained above.

The power converter 702 and the control circuit 706 may function similar to the power converter 704 and the control circuit 708.

Figure 8:
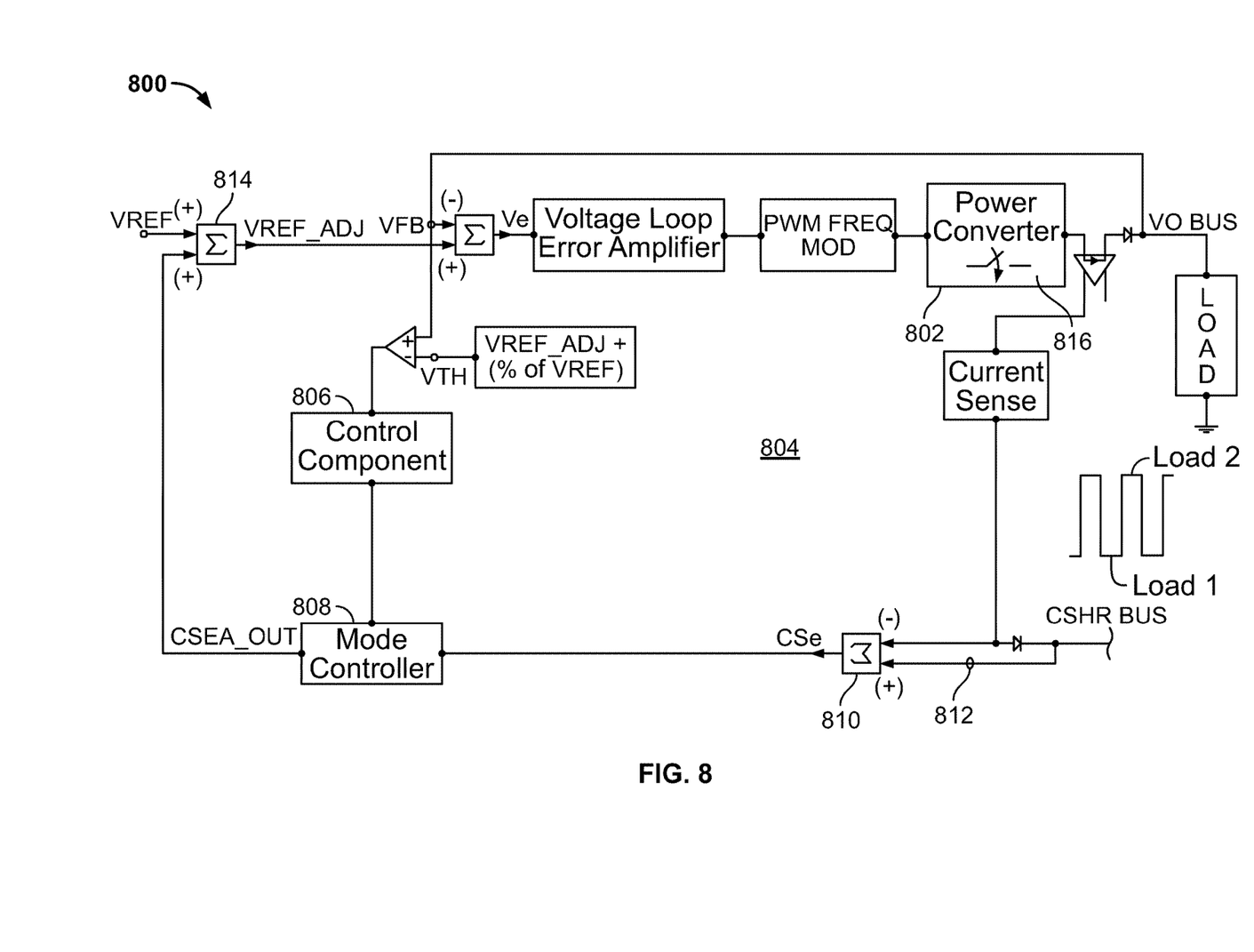
FIG. 8 is a block diagram of a portion of a power supply including one power converter experiencing a dynamic load condition and a control circuit for disabling a current sharing correction function according to another example embodiment.

FIG. 8 illustrates a portion of a power supply 800 including a power converter 802 and a control circuit 804. The control circuit 804 can be similar to the control circuit 708 of FIG. 7. Although not shown, the power supply 800 can include another power converter coupled in parallel with the power converter 802 and optionally another control circuit in communication with the control circuit 804. In such cases, outputs of the power converters are combined at an output bus (Vo bus) and a current reference input can be shared between the power converters via a current sharing bus (CSHR bus), as explained above. For example, the current reference input can be shared with a wired interface and/or a wireless interface (e.g., using RF communication, etc.).

As shown in FIG. 8, the control circuit 804 includes a control component 806, a mode controller 808 coupled to the control component 806 and a current sharing comparator 810 coupled to the mode controller 808. The control component 806 and the current sharing comparator 810 are similar to the control components 712 and the current sharing comparators 710 of FIG. 7. For example, the current sharing comparator 810 can provide an error output (CSe) based on a comparison between a sensed output current of the power converter 802 and a current reference input 812 provided by the other power converter. The control component 806 can store a previous error output of the current sharing comparator 810.

The mode controller 808 governs which current sharing mode is used to control the power converter 802. For example, during normal operation (e.g., when no dynamic load condition is present), the mode controller 808 provides an output (CSea_out) based on the error output (CSe) to a summer 814. The summer 814 adds the output (CSea_out) to a defined reference voltage Vref and provides an adjusted reference voltage (Vref_Adj). The adjusted reference voltage (Vref_Adj) is then used to determine an appropriate error voltage for controlling one or more power switches 816 in the power converter 802. As such, the power converter 802 is controlled in its default master-slave current sharing mode based on the error output (CSe) from the current sharing comparator 810 (e.g., a current sharing correction function).

If a dynamic load condition is detected, mode controller 808 provides the output (CSea_out) based on a previous output of the current sharing comparator 810, as explained above. The dynamic load condition can be detected by comparing a voltage threshold (Vth) and an output voltage of the power converter 802. In the particular example of FIG. 8, the voltage threshold (Vth) is equal to the adjusted reference voltage (Vref_Adj) plus a percentage of the defined reference voltage Vref. For example, the percentage of the defined reference voltage Vref may be about 1.5%, about 2%, about 4% and/or another suitable percentage.

As explained above, a current sharing correction function can be disabled setting one or more components, coefficients, etc. in a control circuit to equal a defined value. For example, FIG. 9 illustrates a control circuit 900 employable to disable a current sharing correction function by setting a control coefficient to equal zero.

The control circuit 900 can control power converters (not shown) in the master-slave relationship, as explained above. In the particular example of FIG. 9, the control circuit 900 includes a proportional-integral controller (PI controller) Additionally and/or alternatively, other suitable controllers may be employed if desired.

Figure 9:
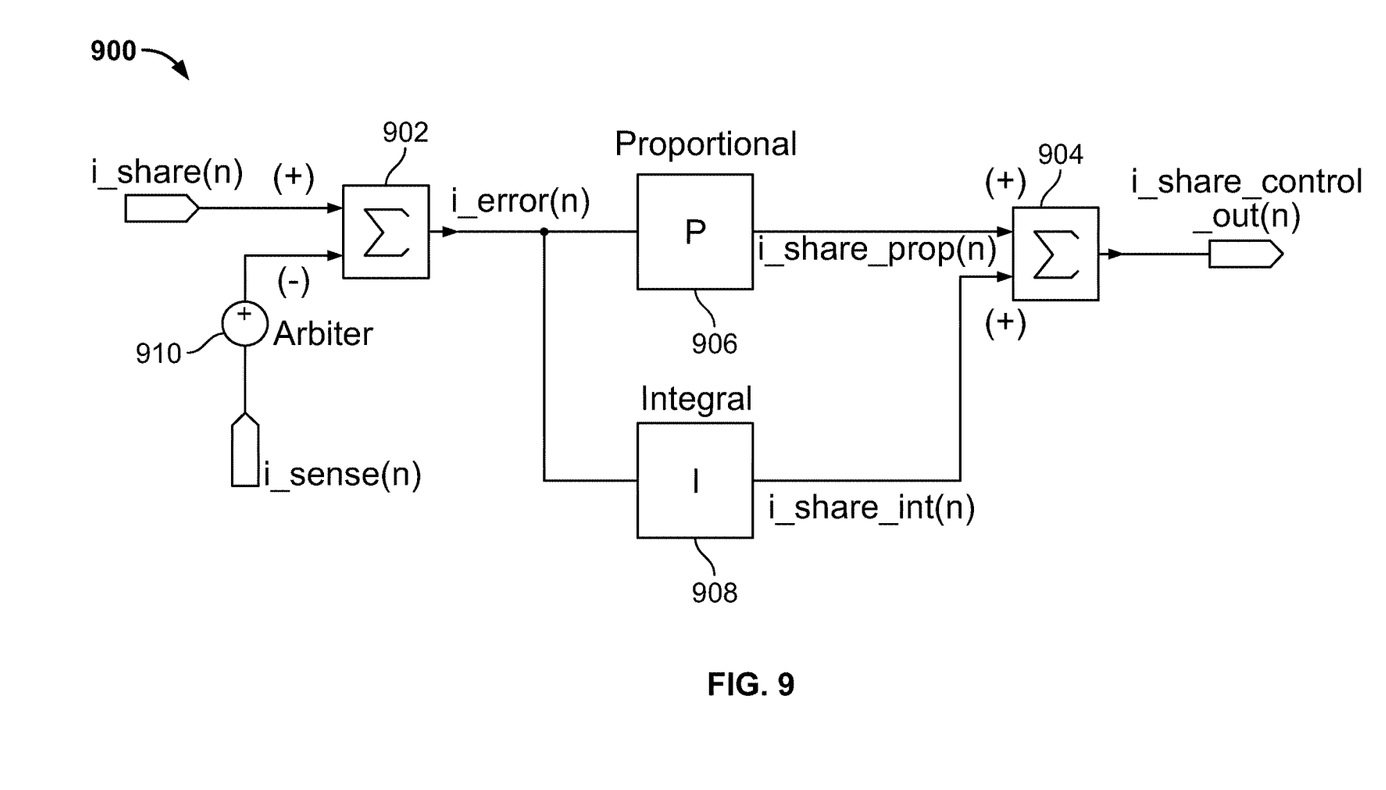
FIG. 9 is a block diagram of a proportional-integral controller (PI controller) used for disabling a current sharing correction function in a power supply according to yet another example embodiment.

As shown in FIG. 9, the control circuit 900 includes two summing components 902, 904, a proportional controller 906 and an integral controller 908. The proportional controller 906 and the integral controller 908 are coupled between the summing components 902, 904. In the particular example of FIG. 9, the integral controller 908 can be considered the current sharing correction function. The proportional controller 906, the integral controller 908 and/or the other components of the control circuit 900 may be implemented as an analog control circuit (e.g., using one or more operational amplifiers, resistors, capacitors, etc.) and/or as a digital control circuit (e.g., using programmable instructions stored in memory).

The control circuit 900 can control a power converter in a default (e.g. normal) modified master-slave current sharing mode based on the integral controller 908. However, when a dynamic load condition is detected, the integral controller 908 is disabled and the power converter is controlled in a modified master-slave current sharing mode, as explained above.

The integral controller 908 (e.g., the current sharing correction function) is disabled in FIG. 9 by changing (e.g., forcing, etc.) the integral coefficient of the integral controller 908 to equal zero. As explained below, this causes a present output of the integral controller 908 to equal the previous output of the integral controller 908. For example, an output (i_share_int (n)) of the integral controller 908 can be calculated by equation (1) below:

$$i\_share\_int(n) = (i\_share\_ki * i\_error(n)) + i\_share\_int(n-1) \qquad (1)$$

where i_share_ki is the integral coefficient of the integral controller 908, i_error(n) is the output of the summing component 902 (e.g., a current-share error), and i_share_int (n−1) is the previous output of the integral controller 908.

As shown in equation 1, the previous output of the integral controller 908 is summed together with the product of the integrator coefficient and the current-share error. If the integrator coefficient is set to zero, equation 1 can be simplified to equation 2 below:

$$i\_share\_int(n) = i\_share\_int(n-1) \qquad (2)$$

Accordingly, the present output of the integral controller 908 is equal to the previous output of the integral controller 908. This same previous output of the integral controller 908 can be continually used until otherwise instructed. During this time, the output of the integral controller 908 is not updated. As such, the integral controller 908 becomes disabled.

By doing so, a current-share control output (i_share_control_out (n)) of the control circuit 900 is restricted from increasing above a current-share control output of a power converter functioning as the master power converter. In turn, this freezes an error voltage used to control an output of the slave power converter. As such, the output voltage of the slave power converter remains substantially constant and prevents output voltage creep-up, as explained above.

Once the dynamic load condition subsides (as further explained below), the integrator coefficient can return to its original value, a new value, etc., and the power converter can be operated in its normal master-slave current sharing mode.

Additionally, and as shown in FIG. 9, the control circuit 900 can optionally include an arbiter 910. The arbiter 910 is an offset voltage that provides a fixed value (e.g., a predefined value, etc.) for distinguishing between the slave power converter and the master power converter. The arbiter value can be added to a current feedback (i_sense (n)) of the slave power converter to prevent an output of the slave power converter from increasing enough to trigger a master-slave role reversal, as explained above.

In some examples, the current sharing correction function may be enabled (and/or re-enabled) after a condition is met. For example, if the dynamic load condition has subsided, the current sharing correction function may be enabled (and/or re-enabled) and the power converters may be controlled in the default master-slave current sharing mode (e.g., a normal master-slave current sharing mode), as explained above.

Whether the dynamic load condition has subsided can be detected by various techniques. For example, a presence of the dynamic load condition may be detected multiple times. The dynamic load condition can be considered subsided when an elapsed period of time between two consecutive detected dynamic load conditions is greater than a defined period of time.

In such examples, a counter may start when a first signal indicating the dynamic load condition is received. If the next signal received also indicates the dynamic load condition, the elapsed period of time between the signals can be compared to the defined period of time. If that elapsed period of time is greater than the defined period of time, the current sharing correction function may be enabled (and/or re-enabled), and the power converters may be controlled in the default master-slave current sharing mode. In such cases, this may indicate, for example, that the dynamic load interval between the consecutive signals may be slower (e.g., a shorter time period) than the current-share control settling time of the converters.

When the elapsed period of time between the two consecutive detected dynamic load conditions is less than the defined period of time, the current sharing correction function may remain disabled. This may indicate, for example, that the dynamic load interval is faster (e.g., a longer time period) than the current-share control settling time of the converters.

The counter may be reset throughout the detection process. For example, the counter may be reset after two consecutive detected dynamic load conditions are received, once a signal does not indicate a dynamic load condition is received, after a period of time has elapsed from the first detected dynamic load condition, etc.

The defined period of time may be based on various parameters. For example, the defined period of time may be based on a dynamic frequency threshold of one of the converters (e.g., the slave converter). In such examples, each of the converters may be operated within a range of dynamic frequencies (e.g., provided by a product specification, a customer specification, etc.). The lowest dynamic frequency of the range of frequencies may be chosen to determine the defined period of time. For example, if the range of dynamic frequencies is 1 kHz to 10 kHz, the lowest dynamic frequency is 1 kHz. This frequency is equivalent to a 1 msec period. Therefore, in this particular example, the defined time interval may be about 1 msec or more.

In other embodiments, the defined period of time may be based on a current-share control settling time. For example, if the power converters controlled in the master-slave relationship are the same (e.g., made by the same manufacturer, include the same parameters, etc.), the current-share control settling time of those power converters can be used as the defined period of time.

Figure 10:
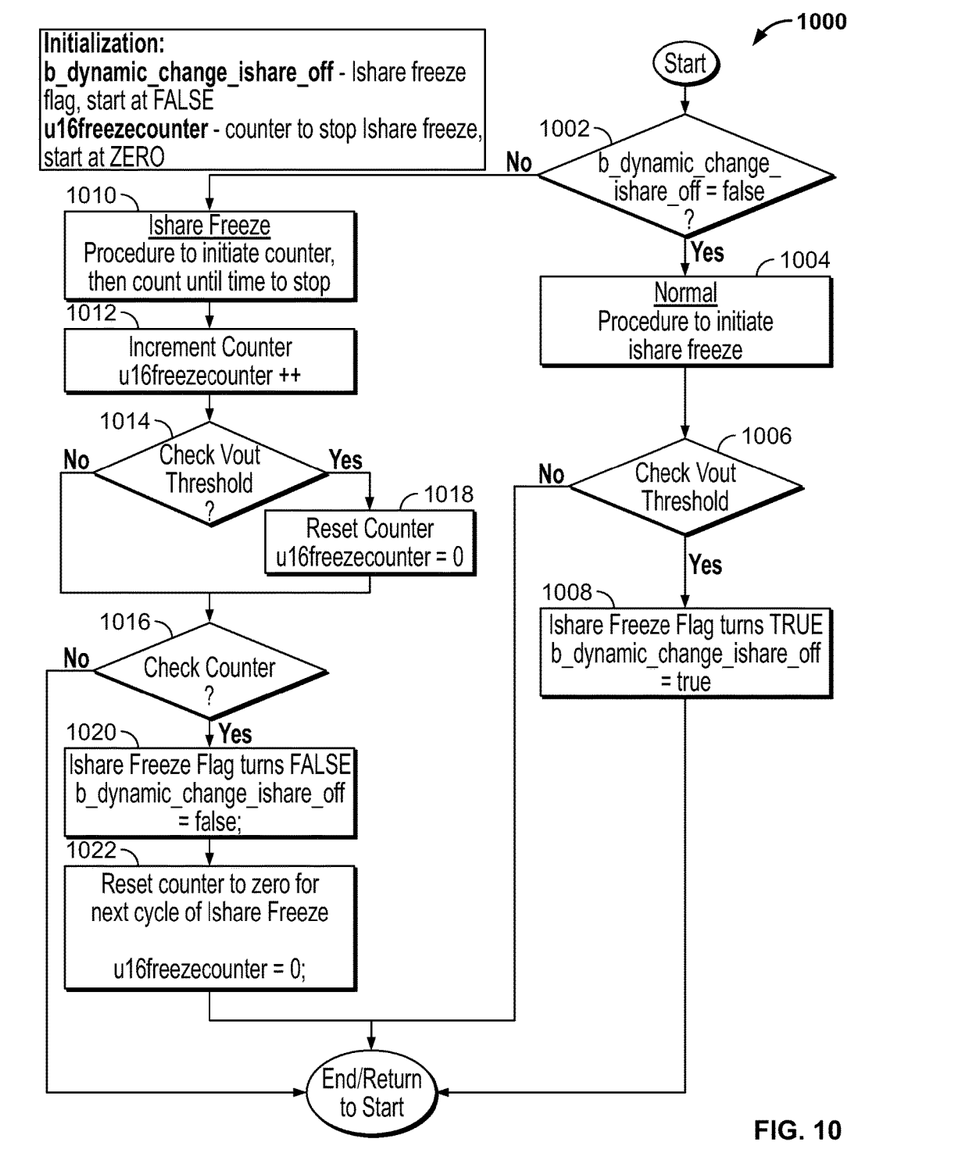
FIG. 10 is a flow chart of a process for transitioning between controlling power converters in a default master-slave current sharing mode and a modified master-slave current sharing mode according to another example embodiment.

FIG. 10 illustrates one particular example of a flow chart 1000 showing a transition between controlling at least two power converters in a default (e.g., normal) master-slave current sharing mode and a modified master-slave current sharing mode. As shown, a current sharing freeze flag (labeled as b_dynamic_change_ishare_off) is initially set to "false" and a counter (labeled as u16freezecounter) is initially set to zero.

After starting the process, the flow chart 1000 initially determines the state of the current sharing freeze flag (b_dynamic_change_ishare_off) in block 1002. For example, if b_dynamic_change_ishare_off (hereinafter "dynamic_change") is set to "false," the power converters are operated in the normal master-slave current sharing mode, as shown in block 1004. As such, the power converters are controlled based on a current sharing correction function, as explained above. If, however, dynamic_change is not set to "false," the power converters are operated in the modified master-slave current sharing mode, as shown in block 1010. In such examples, the current sharing correction function is disabled, as explained above.

When the power converters are operated in the normal master-slave current sharing mode (block 1004), the presence of a dynamic load condition can be detected in block 1006. For example, an output voltage (Vout) of one of the power converters can be compared to a Vout threshold to detect a dynamic load condition. The Vout threshold may be, for example, based on an adjusted reference voltage and/or a set reference voltage, as explained above.

If the presence of a dynamic load condition is not detected in block 1006, dynamic_change remains set to "false," and the process can return to start. If, however, the presence of a dynamic load condition is detected in block 1006, dynamic_change is set to "true" in block 1008, and the process can return to start. At this time, the power converters transition from operating in their normal master-slave current sharing mode to operating in their modified master-slave current sharing mode (block 1010).

When the power converters are operated in the modified master-slave current sharing mode (block 1010), a counter is started and incremented (labeled as u16freezecounter++) in block 1012. Next, the presence of the dynamic load condition can be detected again in block 1014. For example, the output voltage (Vout) of the power converter can be compared to the same Vout threshold as above or a different Vout threshold to detect whether the dynamic load condition still exists.

If the presence of the dynamic load condition is not detected in block 1014, the counter may be checked in block 1016. For example, the value of the counter can be compared to a threshold (e.g., a fixed value or a variable value). The threshold may be based on, for example, an expected frequency of a dynamic condition. In some examples, the threshold can be set to 150 (e.g., 150 counts, 150 seconds, etc.)

When the presence of the dynamic load condition is detected in block 1014, the counter is reset to zero in block 1018. The process then proceeds to checking the counter in block 1016, as explained above.

If the value of the counter is less than the threshold when the counter is checked in block 1016, the process can return to start. If, however, the value of the counter is equal to or greater than the threshold in block 1016, dynamic_change is set to "false" in block 1020 and the counter is reset to zero in block 1022. The process can then return to start.

Figure 11:
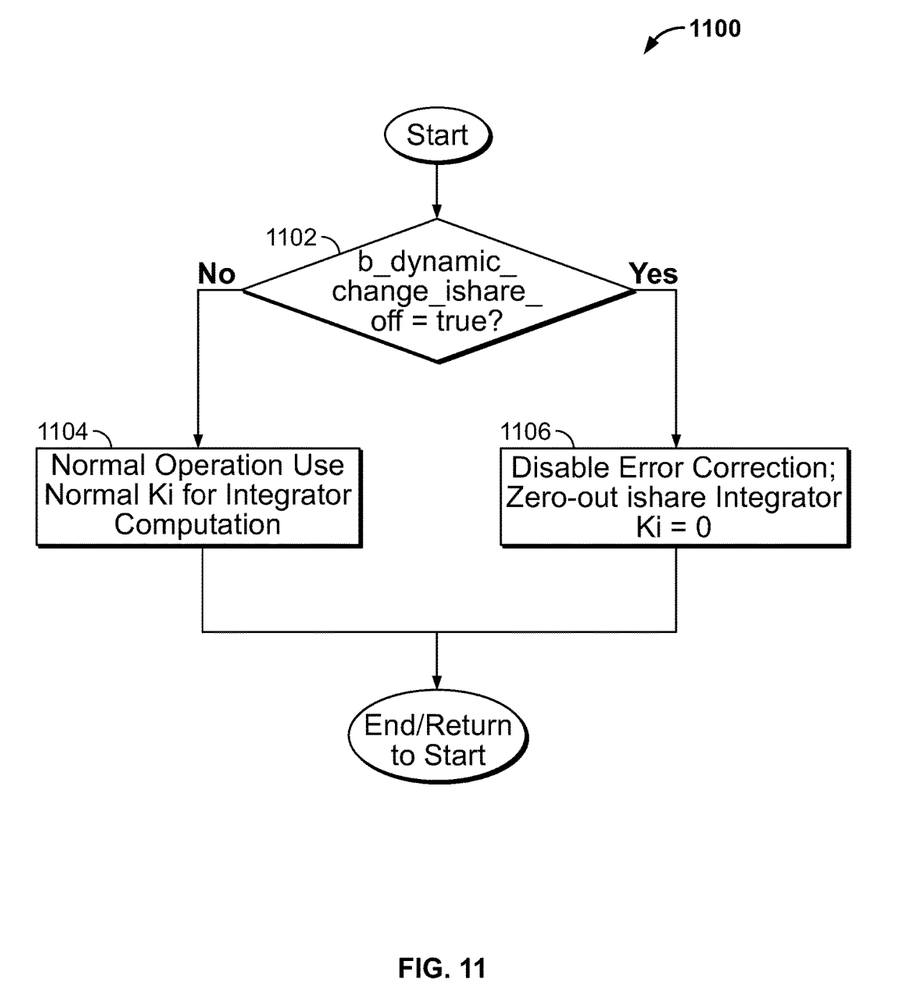
FIG. 11 is a flow chart of a process for entering a modified master-slave current sharing control mode according to yet another example embodiment.

FIG. 11 illustrates a flow chart 1100 for entering a modified master-slave current sharing control mode. For example, the process shown in the flow chart 1100 may be performed when the process of flow chart 1000 enters block 1010 of FIG. 10.

After starting, the status of the current sharing freeze flag (dynamic_change) in block 1102 is determined, as explained above. If dynamic_change is set to "false" indicating no dynamic load condition, the current sharing correction function is enabled (and/or re-enabled) in block 1104, and the process can return to start. In other words, the current sharing correction function of the control circuit implementing the process of FIG. 11 is controlling power converters in a normal master-slave current sharing mode. For example, and as shown in FIG. 11, if dynamic_change is set to "false," the integral coefficient of the integral controller is set to its normal value, as explained above.

If, however, the status of dynamic_change is "true" (block 1102) indicating a dynamic load condition exists, a current sharing correction function is disabled in block 1106 and the process can return to start. For example, and as shown in FIG. 11, the current sharing correction function is disabled by setting an integral coefficient of an integral controller to zero, as explained above.

Figure 12:
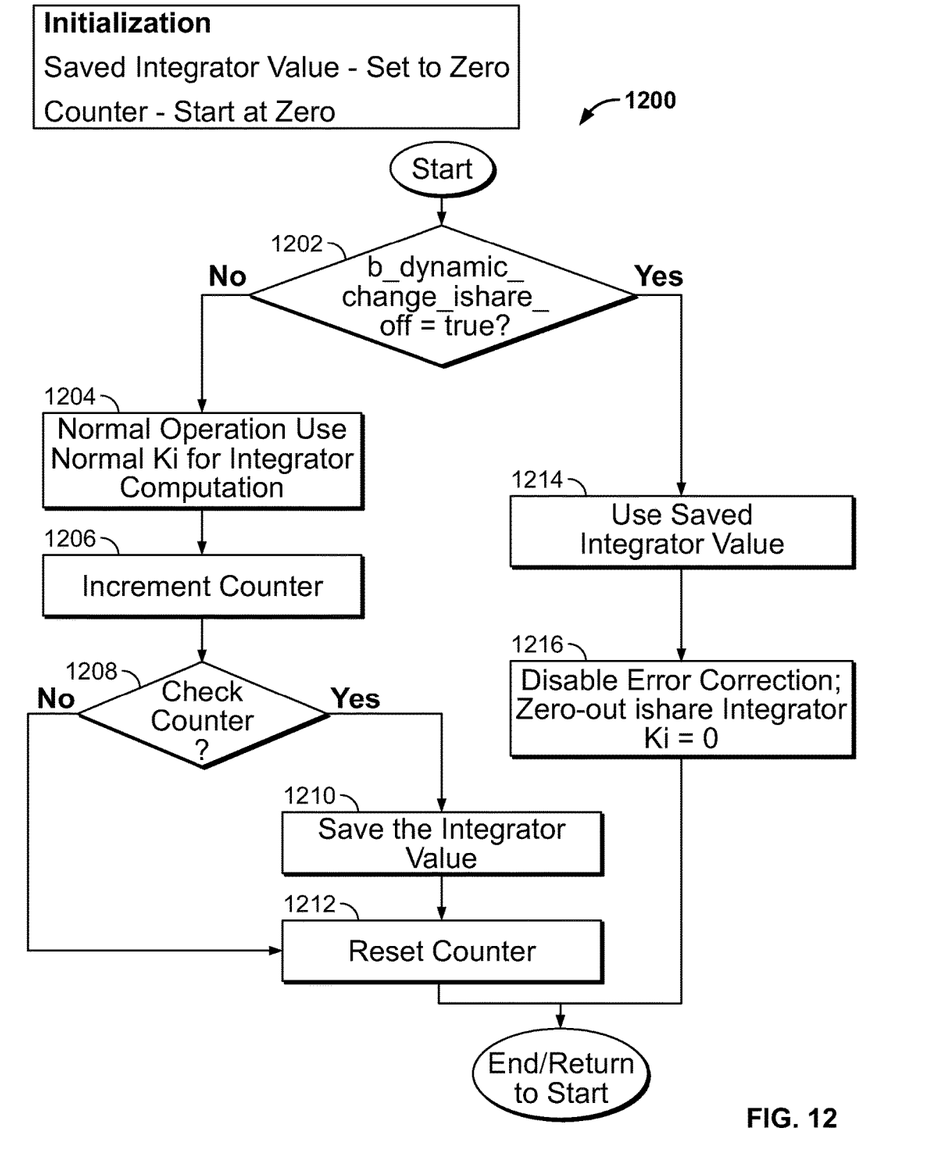
FIG. 12 is a flow chart of a process for entering a modified master-slave current sharing control mode while employing a counter according to another example embodiment.

FIG. 12 illustrates another flow chart 1200 for entering a modified master-slave current sharing control mode. Like the process of FIG. 11, the process shown in the flow chart 1200 of FIG. 12 may be performed when the process of flow chart 1000 enters block 1010 of FIG. 10. Initially, a counter utilized in the process of FIG. 12 is set to zero, and a value of a saved integrator value (further explained below) is set to zero.

As in the flow chart 1100 of FIG. 11, the flow chart 1200 of FIG. 12 begins by determining the status of the current sharing freeze flag (dynamic_change) in block 1202. If the status of dynamic_change is "false" in block 1202 (indicating no dynamic load condition), the current sharing correction function is enabled (and/or re-enabled) in block 1204, and the power converter is controlled in a normal (e.g., default) master-slave current sharing mode. For example, and similar to the process of FIG. 11, an integral coefficient of an integral controller (e.g., the integral controller 908 shown in FIG. 9) can be set to its normal value in block 1204, as explained above.

The process of FIG. 12 then increments a value of the counter in block 1206, and checks the value of the counter in block 1208, as explained above. For example, the counter may be continuously, periodically, etc. incremented in block 1206 when the power converter is controlled in its normal master-slave current sharing mode. This increasing value of the counter can then be compared (e.g., periodically, etc.) to a counter threshold in block 1208. In some examples, the counter threshold can be set to three, four, six and/or another suitable value corresponding to a particular amount of time, a number of cycles, etc. before a detection of a dynamic load condition.

If the value of the counter is less than the counter threshold in block 1208, the counter is reset to zero in block 1212, and the process returns to start. If, however, the value of the counter is equal to or greater than the counter threshold in block 1208, a present integrator value is saved in block 1210. For example, the integrator value may be an output of an integral controller such as an output (i_share_int (n)) of the integral controller 908 shown in FIG. 9. In such examples, if the value of the counter is equal to or greater than the counter threshold, an output of an integral controller may be saved in memory. This present integrator value can replace the initially saved integrator value (zero). The newly saved integrator value may represent the output of the integral controller when no dynamic load condition is present.

After the integrator value is saved in block 1210, the counter is reset to zero in block 1212, and the process returns to start.

If, however, the status of dynamic_change is "true" in block 1202 (indicating a dynamic load condition exists), the saved integrator value can be used by a control circuit implementing the process of FIG. 12, as shown in block 1214. For example, an output of the control circuit's integral controller (as explained above) can be set to the saved integrator value in block 1214. This forces the output of the integral controller to equal a value prior to the dynamic load condition.

For example, if the status of dynamic_change is "true" in block 1202 and the stored integrator value is zero (e.g., the initially stored value), the output of the integral controller can be set to zero. In other examples, if the stored integrator value is not zero, the output of the integral controller can be set (at least momentarily) to this nonzero value in block 1214.

Subsequently, a current sharing correction function is disabled in block 1216 (as explained above) and the process can return to start. For example, the integral coefficient of the integral controller can be set to zero thereby disabling the current sharing correction function, as explained above. If, however, the status of dynamic_change is later "false" in block 1202, the integral coefficient can be set back to its normal value and the integral controller can resume outputting an updated value in block 1204. This re-enables the current sharing correction function in block 1204, and the power converter is controlled again in its normal master-slave current sharing mode The processes shown in the flow charts 1000, 1100, 1200 of FIGS. 10-12 can be implemented with any suitable control circuit including, for example, the control circuits 610, 706, 708, 804, 900 of FIGS. 6-9. For example, the process shown in the flow chart 1000 of FIG. 10 may be implemented by the control component 806 of FIG. 8 and the process shown in the flow chart 1100 of FIG. 11 and/or the process shown in the flow chart 1200 of FIG. 12 may be implemented by the mode controller 808 of FIG. 8.

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). As such, the control circuits may employ suitable software and/or hardware configurations. For example, the controls circuits may execute computer-executable instructions stored in memory, include logic circuitry, etc. adapted to perform one or more instructions (e.g., one or more of the features disclosed herein), etc. Additionally, the entire control circuit, some of the control circuit, or none of the control circuit may be positioned on an integrated circuit. In some examples, the control circuits may include a PI controller as shown in FIG. 9 and/or another suitable controller such as a proportional-integral-derivative controller (PID) controller.

The power supplies disclosed herein may be any suitable power supply. For example, any one of the power supplies may be a switched mode power supply (SMPS). In such examples, power converters in the SMPS include one or more power switches and an optional control signal modulator (PWM/FREQ MOD) for producing a pulse width modulated (PWM) signal and/or a pulse-frequency modulated (FM) signal, as shown in the power converter 802 of FIG. 8.

The power converter disclosed herein may include one or more power circuits having any suitable DC-DC switching converter topology including, for example, a forward converter, flyback converter, a buck converter, a boost converter, a bridge converter (e.g., full bridge, half bridge, etc.), etc.

The dynamic load conditions disclosed herein may be detected using various different output related parameters. For example, a dynamic load condition may be detected based on a sensed output voltage of a power converter as shown in FIGS. 7 and 8. In other examples, a dynamic load condition may be detected based on a sensed output current, an error voltage (e.g., the error voltage Ve of FIG. 8, etc.), etc.

By employing one or more features disclosed herein, output voltage creep-up is prevented for power converters controlled in a slave-master relationship during dynamic load conditions. As such, an erroneous output bus voltage provided to a load and possible over-voltage fault occurrences can be prevented during dynamic load conditions.

Additionally, because the output voltage creep-up is prevented, output current oscillation between the power converters may be prevented during dynamic load conditions. As such, the power converters can experience suitable current sharing during dynamic load conditions. This ensures one of the power converters is not forced to provide a large portion of the load which may cause that power converter to shut down due to overload protection.

Further, the features disclosed herein may be implemented in an existing power supply having power converters with different voltage-loop responses. For example, one of the control circuits disclosed herein, a power converter including one of the control circuits, etc. may be added to an existing power supply having power converters made by different manufacturers (and therefore likely having different voltage-loop responses) without concern of output voltage creep-up and output current oscillation during dynamic load conditions.

Moreover, sometimes current settling times of power converters are adjusted to alleviate output voltage creep-up conditions. This can be achieved by increasing current-share loop bandwidths for the power converters. However, doing so may cause erratic behavior in the output voltages of the power converters. By using the features disclosed herein, increases in current-share loop bandwidth(s) are not required to alleviate output voltage creep-up conditions during dynamic load conditions. Therefore, erratic behavior in the output voltages due to increased current-share loop bandwidth(s) is eliminated during dynamic load conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power supply for supplying a regulated output voltage, the power supply comprising:
    two power converters each including an output coupled in parallel with each other, the two power converters controllable in a master-slave current sharing relationship, and
    a control circuit coupled to the two power converters, the control circuit adapted to detect a presence of a dynamic load condition of a load coupled to the power supply, control the two power converters in a default master-slave current sharing mode based on a current sharing correction function, and in response to detecting the presence of the dynamic load condition, disable the current sharing correction function so that the two power converters are controlled in a modified master-slave current sharing mode to substantially prevent oscillation between output currents of the two power converters.

2. The power supply of claim 1 wherein the control circuit includes an integral coefficient, wherein the current sharing correction function is based in part on the integral coefficient and wherein the control circuit is adapted to disable the current sharing correction function by changing the integral coefficient to equal zero.

3. The power supply of claim 2 wherein the control circuit includes a proportional-integral (PI) controller and wherein the integral coefficient is a portion of the PI controller.

4. The power supply of claim 1 wherein the control circuit is adapted to detect if the dynamic load condition has subsided, and in response to detecting the dynamic load condition has subsided, enable the current sharing correction function and control the two power converters in the default master-slave current sharing mode based on the current sharing correction function.

5. The power supply of claim 4 wherein the control circuit is adapted to detect a presence of a dynamic load condition multiple times and wherein the dynamic load condition has subsided when an elapsed period of time between consecutive detected dynamic load conditions is greater than a defined period of time.

6. The power supply of claim 5 wherein the defined period of time is based on a dynamic frequency threshold for one of the two power converters operating as the slave converter.

7. The power supply of claim 5 wherein the defined period of time is based on an output current settling time.

8. The power supply of claim 1 wherein the control circuit is adapted to sense an output parameter of the one of the two power converters to detect the presence of the dynamic load condition.

9. The power supply of claim 1 wherein the control circuit includes a digital control circuit.

10. A control circuit for controlling two power converters of a power supply in a master-slave current sharing relationship, the control circuit adapted to detect a presence of a dynamic load condition of a load coupled to the power supply, control the two power converters in a default master-slave current sharing mode based on a current sharing correction function, and in response to detecting the presence of the dynamic load condition, disable the current sharing correction function so that the two power converters are controlled in a modified master-slave current sharing mode to substantially prevent oscillation between output currents of the two power converters.

11. The control circuit of claim 10 wherein the control circuit includes an integral coefficient, wherein the current sharing correction function is based in part on the integral coefficient and wherein the control circuit is adapted to disable the current sharing correction function by changing the integral coefficient to equal zero.

12. The control circuit of claim 11 wherein the control circuit includes a proportional-integral (PI) controller and wherein the integral coefficient is a portion of the PI controller.

13. The control circuit of claim 10 wherein the control circuit is adapted to detect if the dynamic load condition has subsided, and in response to detecting the dynamic load condition has subsided, enable the current sharing correction function and control the two power converters in the default master-slave current sharing mode based on the current sharing correction function.

14. The control circuit of claim 13 wherein the control circuit is adapted to detect a presence of a dynamic load condition multiple times and wherein the dynamic load condition has subsided when an elapsed period of time between consecutive detected dynamic load conditions is greater than a defined period of time.

15. The control circuit of claim 14 wherein the defined period of time is based on a dynamic frequency threshold for one of the two power converters operating as the slave converter.

16. The control circuit of claim 14 wherein the defined period of time is based on an output current settling time.

17. A method for controlling two power converters of a power supply in a master-slave current sharing relationship, the method comprising:
   detecting a presence of a dynamic load condition of a load coupled to the power supply,
   controlling the two power converters in a default master-slave current sharing mode based on a current sharing correction function, and
   in response to detecting the presence of the dynamic load condition, disabling the current sharing correction function so that the two power converters are controlled in a modified master-slave current sharing mode to substantially prevent oscillation between output currents of the two power converters.

18. The method of claim 17 wherein disabling the current sharing correction function includes changing an integral coefficient to equal zero.

19. The method of claim 17 further comprising enabling the current sharing correction function when the dynamic load condition has subsided.

20. The method of claim 17 wherein detecting the presence of the dynamic load condition includes sensing an output parameter of the one of the two power converters and comparing the output parameter to a defined threshold.

* * * * *